(12) United States Patent
Svarfvar

(10) Patent No.: US 6,670,893 B1
(45) Date of Patent: Dec. 30, 2003

(54) DOUBLE-SIDED KEYBOARD HAVING A SPACER PLATE WITH APERTURES TO HOLD CONTACTS

(75) Inventor: Bror Svarfvar, Kaarina (FI)

(73) Assignee: Nokia Corporation, Espoo (FI)

( * ) Notice: Subject to any disclaimer, the term of this patent is extended or adjusted under 35 U.S.C. 154(b) by 430 days.

(21) Appl. No.: 09/718,447

(22) Filed: Nov. 22, 2000

(51) Int. Cl.[7] ............................................. H03K 17/965
(52) U.S. Cl. ........................ 341/22; 345/168; 345/169
(58) Field of Search .............................. 341/22, 31, 34, 341/28, 13; 345/168, 169; 379/433.07, 433.06, 368, 369, 17, 20; 250/227.22; 313/372; 200/9, 5 R, 5 A, 13, 14

(56) References Cited

U.S. PATENT DOCUMENTS

| | | | | |
|---|---|---|---|---|
| 4,806,908 A | * | 2/1989 | Krupnik | 341/22 |
| 5,189,632 A | * | 2/1993 | Paajanen et al. | 708/109 |
| 5,564,078 A | * | 10/1996 | Nagai | 455/575.3 |
| 5,584,054 A | * | 12/1996 | Tyneski et al. | 455/566 |
| 5,715,524 A | | 2/1998 | Jambhekar et al. | 455/90 |
| 5,742,894 A | * | 4/1998 | Jambhekar et al. | 455/575.3 |
| 6,038,313 A | | 3/2000 | Collins | 379/433 |
| 6,046,730 A | | 4/2000 | Bowen et al. | 345/168 |
| 6,542,606 B1 | * | 4/2003 | Lehtinen et al. | 379/433.05 |

FOREIGN PATENT DOCUMENTS

| | | | |
|---|---|---|---|
| EP | 0472361 | 2/1992 | H04M/1/72 |
| JP | 1187718 | 7/1989 | |

* cited by examiner

Primary Examiner—Michael Horabik
Assistant Examiner—Hung Q Dang
(74) Attorney, Agent, or Firm—Ware, Fressola, Van Der Sluys & Adolphson LLP

(57) ABSTRACT

A keyboard and a method of arranging such a keyboard. The keyboard has a first side and a second side for providing information in an electronic device. The keyboard includes one electronic circuit located on the first side and another on the second side, and a spacer plate separating the electronic circuits. The spacer plate has a plurality of apertures to house a plurality of dome-shaped contacts, some facing the first circuit and some facing the second circuit. A plurality of keys located on both sides of the keyboard for pressing the dome-shaped contacts to make electrical contact with the facing electronic circuits. The spacer plate can be used as a light guide for illuminating the keyboard.

48 Claims, 9 Drawing Sheets

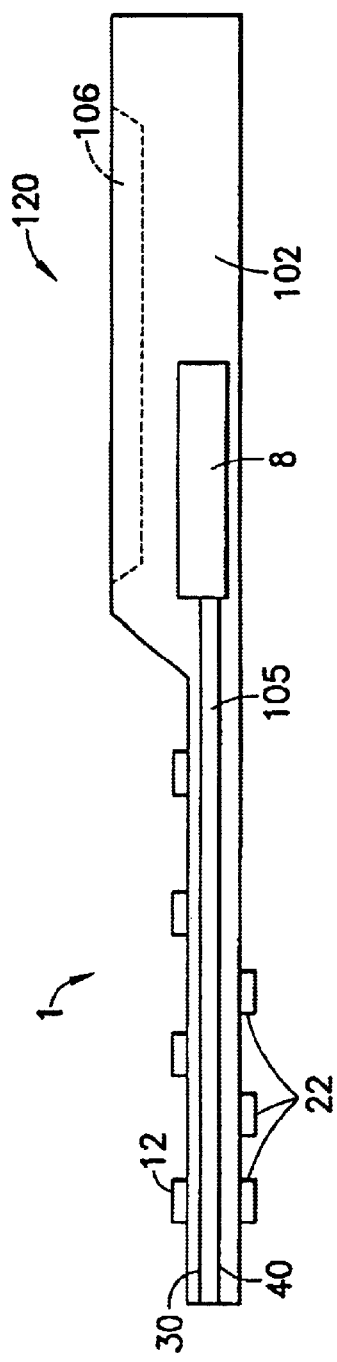
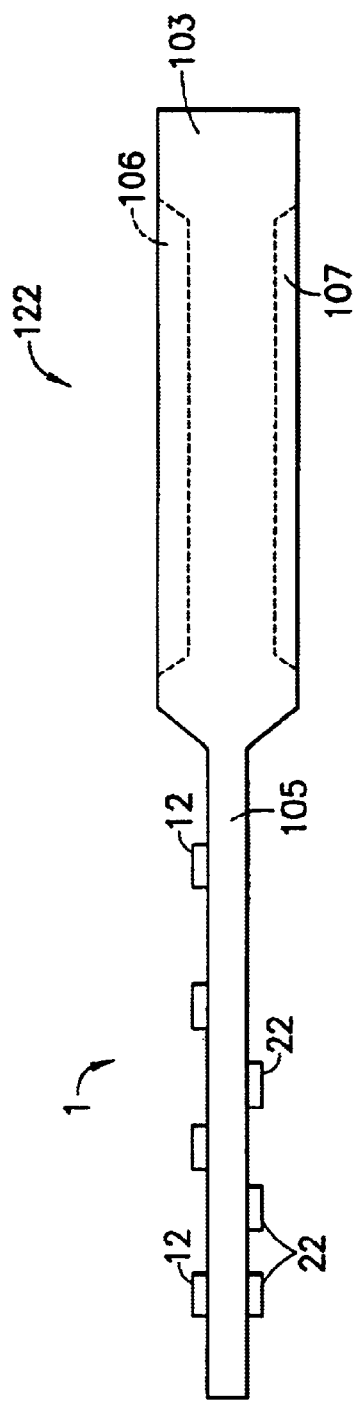

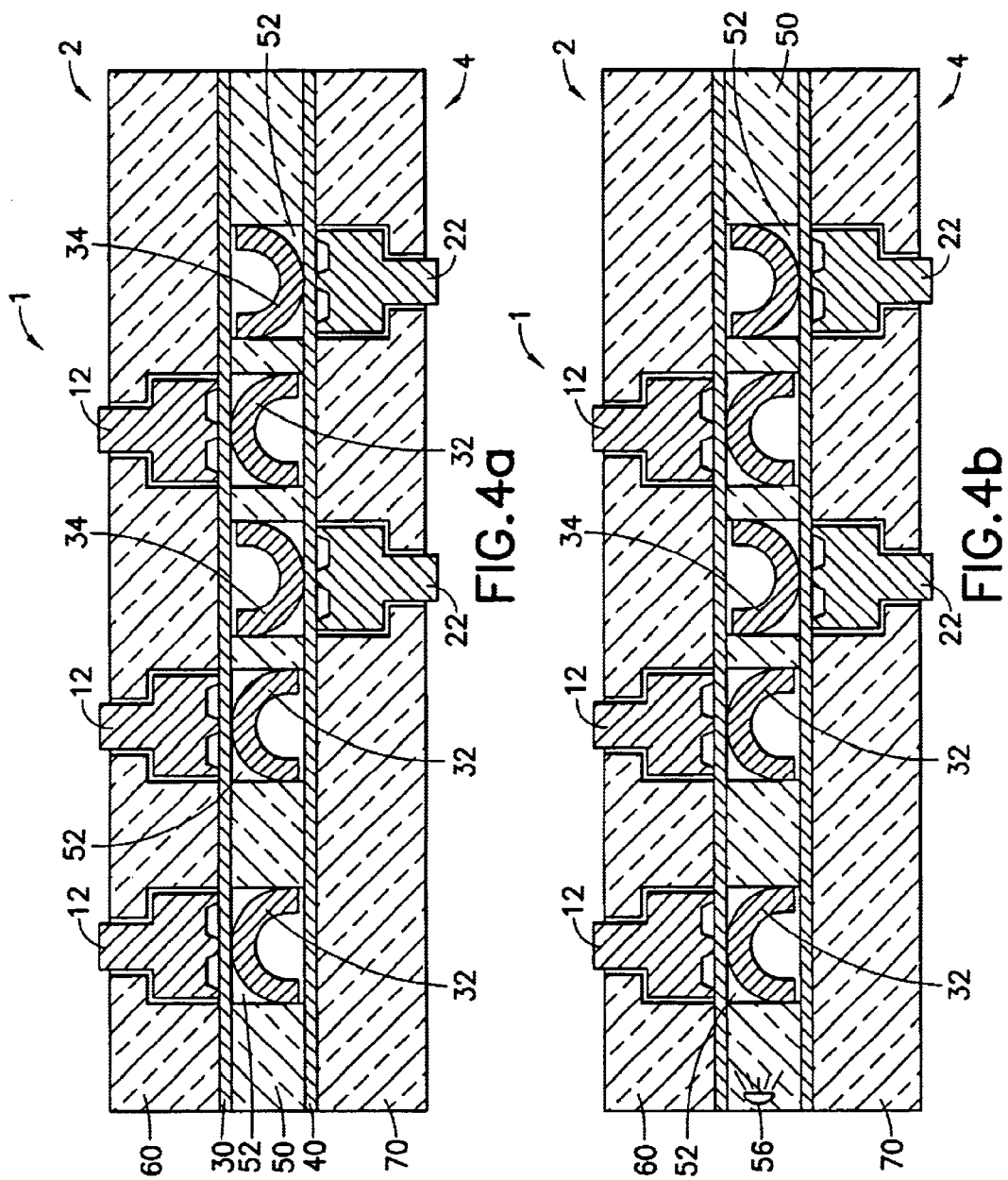

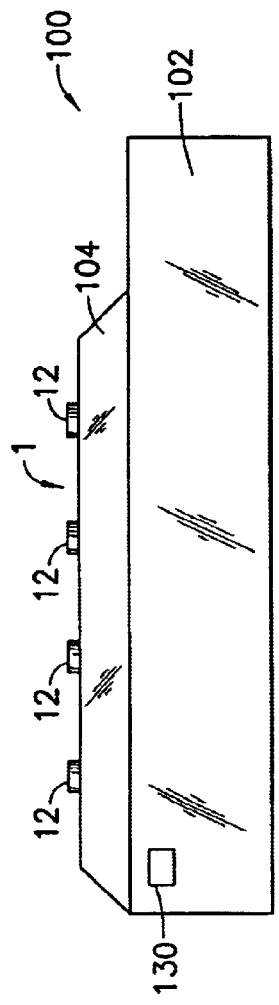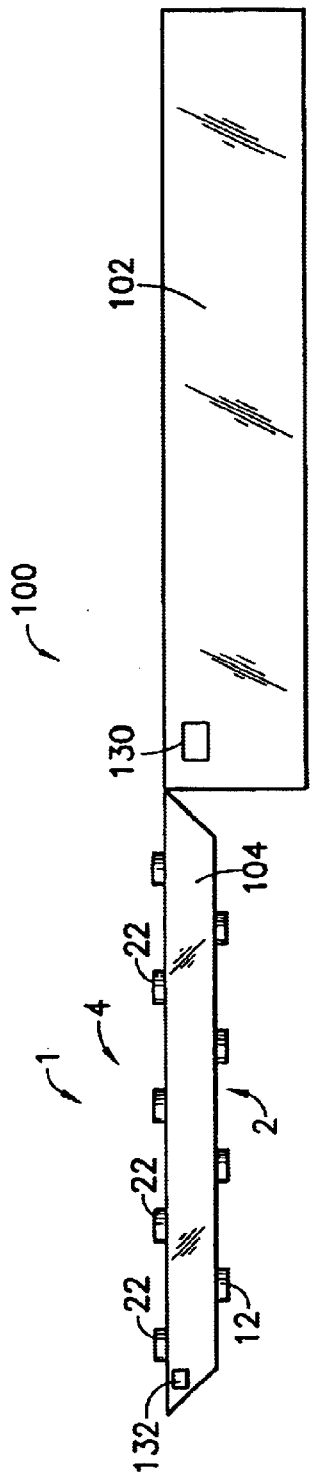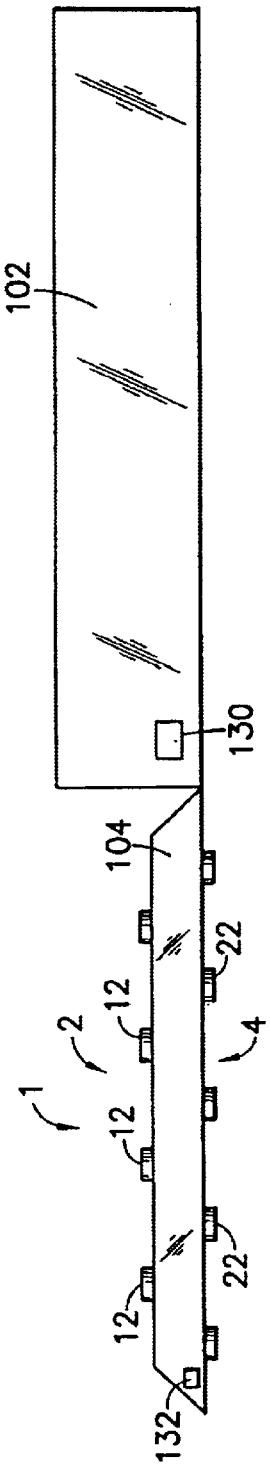

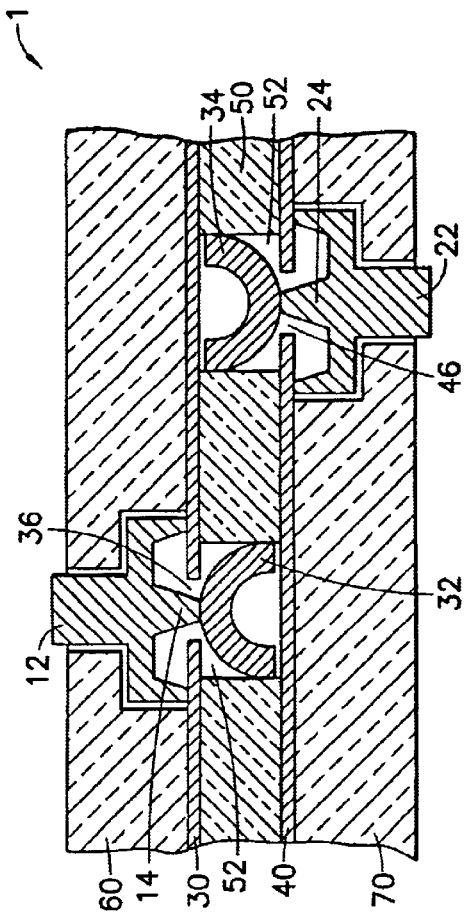
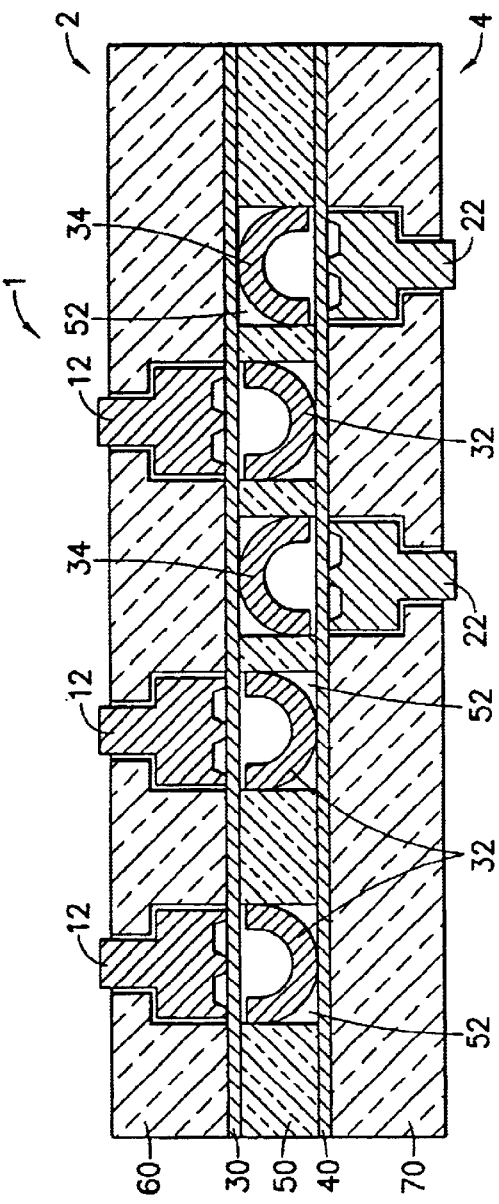

DOUBLE-SIDED KEYBOARD HAVING A SPACER PLATE WITH APERTURES TO HOLD CONTACTS

FIELD OF THE INVENTION

The present invention relates generally to a keyboard in an electronic device and, more particularly, to a double-sided keyboard having two electronic circuits located on both sides of the keyboard for entering information in the electronic device.

BACKGROUND OF THE INVENTION

Man-machine interaction, in terms of user input, is of the utmost importance in portable communication devices. Splitting up one single keyboard into two or more sub-keyboards is one of the ways for improving the efficient use of a communication device. For example, in a Nokia Communicator, the phone keyboard is used when the Communicator functions as a telephone, and another separate QWERTY keyboard is used when the Communicator is used for other functions. As portable communication devices become smaller and more compact, the available space and volume for two or more sub-keyboards becomes more limited. One way to solve this limited space problem is to implement two keyboards on the two sides of the phone cover, which is also known as an active flip, or on the opposite sides of the device itself. Conventionally, each of the two keyboards on the same active flip, or the device itself, has a separate circuit board to allow the keys on each keyboard to enter information through their own activation devices on the respective circuit board. This type of double-sided keyboard is disclosed, for example, in U.S. Pat. No. 6,038,313 (Collins). Although this type of double-sided keyboard arrangement can save space, it is costly to produce. U.S. Pat. Nos. 5,715,524 and 5,742,894 (Jambhekar et al.) disclose a radio communication device, wherein a touch screen display is used to enter information when the device is in an opened position, and a depressible keypad is used when the device is an closed position. When the device is in the closed position, part of the touch screen display is concealed behind the depressible keypad. The keys on the depressible keypad use the concealed portion of the touch screen display to enter information. While this type of multiple keyboard can save space and cost, it is only applicable for those devices that have a touch screen display.

It is desirable to provide a cost-effective method and apparatus for entering information using different keys on different sub-keyboards without the need of a touch screen display.

SUMMARY OF THE INVENTION

It is an object of the present invention to provide a double-sided keyboard that is simple and low-cost to produce.

It is another object of the present invention to provide a double-sided keyboard that is thin.

It is yet another object of the present invention to provide a doubled-side keyboard that is illuminated with a simple component therein.

Accordingly, the first aspect of the present invention is a keyboard having a first side and a second side for providing information in an electronic device. The keyboard comprises:

a first electronic circuit located on the first side;

a second electronic circuit located on the second side;

a spacer plate, located between the first electronic circuit and the second electronic circuit, having a first plurality of apertures adjacent the first electronic circuit and a second plurality of apertures adjacent the second electronic circuit;

a first plurality of contacting members separately disposed in the first plurality of apertures;

a second plurality of contacting members separately disposed in the second plurality of apertures;

a first plurality of keys, located on the second side of the keyboard, capable of causing one or more of the first plurality of contacting members to make contact with the first electronic circuit board for providing signals indicative of the information for use in the electronic device, and a second plurality of keys, located on the first side of the keyboard, capable of causing one or more of the second plurality of contacting members to make contact with the second electronic circuit for providing signals indicative of the information for use in the electronic device.

Preferably, the spacer plate is made of a transparent material so that it can also be used as a light guide for illuminating the keyboard.

Preferably, the first and second electronic circuits comprise one or more resistive circuits using resistive strips for providing information in the electronic device.

The second aspect of the present invention is a method for arranging a keyboard having a first side and a second side for providing information in an electronic device. The method comprises:

providing a first electronic circuit located on the first side;

providing a second electronic circuit located on the second side;

providing a spacer plate between the first electronic circuit and the second electronic circuit, wherein the spacer plate includes a first plurality of apertures adjacent the first electronic circuit and a second plurality of apertures adjacent the second electronic circuit;

providing a first plurality of contacting members separately disposed in the first plurality of apertures;

providing a second plurality of contacting members separately disposed in the second plurality of apertures;

providing a first plurality of keys on the second side of the keyboard, wherein the first plurality of keys are capable of causing one or more of the first plurality of contacting members to make contact with the first electronic circuit board for providing signals indicative of the information for use in the electronic device, and providing a second plurality of keys on the first side of the keyboard, wherein the second plurality of keys are capable of causing one or more of the second plurality of contacting members to make contact with the second electronic circuit for providing signals indicative of the information for use in the electronic device.

Preferably, the spacer plate is made of a transparent material so that it can also be used as a light guide for illuminating the keyboard.

Preferably, the first and second electronic circuits comprise one or more resistive circuits using resistive strips for providing information in the electronic device.

The third aspect of the present invention is an electronic device having a signal processor to process information. The electronic device comprises:

a keyboard having a first side and a second side including:
- a first electronic circuit located on the first side;
- a second electronic circuit located on the second side;
- a spacer plate, located between the first electronic circuit and the second electronic circuit, having a first plurality of apertures adjacent the first electronic circuit and a second plurality of apertures adjacent the second electronic circuit;
- a first plurality of contacting members separately disposed in the first plurality of apertures;
- a second plurality of contacting members separately disposed in the second plurality of apertures;
- a first plurality of keys, located on the second side of the keyboard, capable of causing one or more of the first plurality of contacting members to make contact with the first electronic circuit board for providing signals indicative of the information for use in the electronic device; and
- a second plurality of keys, located on the first side of the keyboard, capable of causing one or more of the second plurality of contacting members to make contact with the second electronic circuit for providing signals indicative of the information for use in the electronic device; and a connection mechanism for conveying the signals to the signal processor.

Preferably, the spacer plate is made of a transparent material so that it can also be used as a light guide for illuminating the keyboard.

Preferably, the first and second electronic circuits comprise one or more resistive circuits using resistive strips for providing information in the electronic device.

The present invention will become transparent upon reading the description taken in conjunction with FIGS. 1 to 8.

BRIEF DESCRIPTION OF THE DRAWINGS

FIG. 3a is a diagrammatic representation illustrating an electronic device having a double-sided keyboard as an extended portion of the electronic device.

FIG. 3b is a diagrammatic representation illustrating another electronic device having a double-sided keyboard as an extended portion of the electronic device.

FIG. 4a is a diagrammatic representation illustrating the cross sectional view of the double-sided keyboard, according to the present invention.

FIG. 4b is a diagrammatic representation illustrating the cross sectional view of the double-sided keyboard, wherein the spacer plate is used as a light guide.

FIG. 7a is a diagrammatic representation illustrating a switching mechanism for defining a keyboard mode of an electronic device when the cover is closed.

FIG. 7b is a diagrammatic representation illustrating the switching mechanism for defining another keyboard mode of the same electronic device when the cover is open.

FIG. 7c is a diagrammatic representation illustrating the switching mechanism for defining yet another keyboard mode when the cover is open.

FIG. 8a is a diagrammatic representation of another embodiment of the double-sided keyboard, according to the present invention.

FIG. 8b is a diagrammatic representation of yet another embodiment of the double-sided keyboard, according to the present invention.

DETAILED DESCRIPTION

Figure 1B:
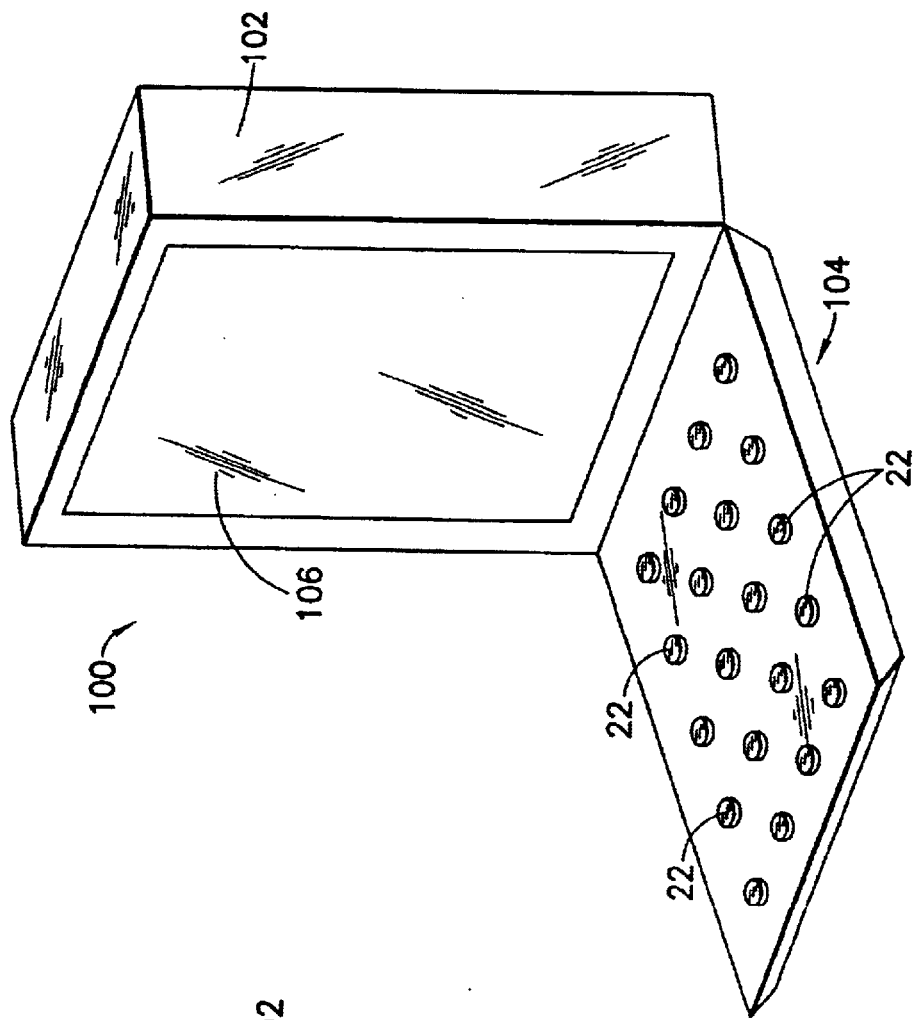
FIG. 1b is a diagrammatic representation illustrating the same electronic device with the cover opened to expose another set of keys.
Figure 1A:
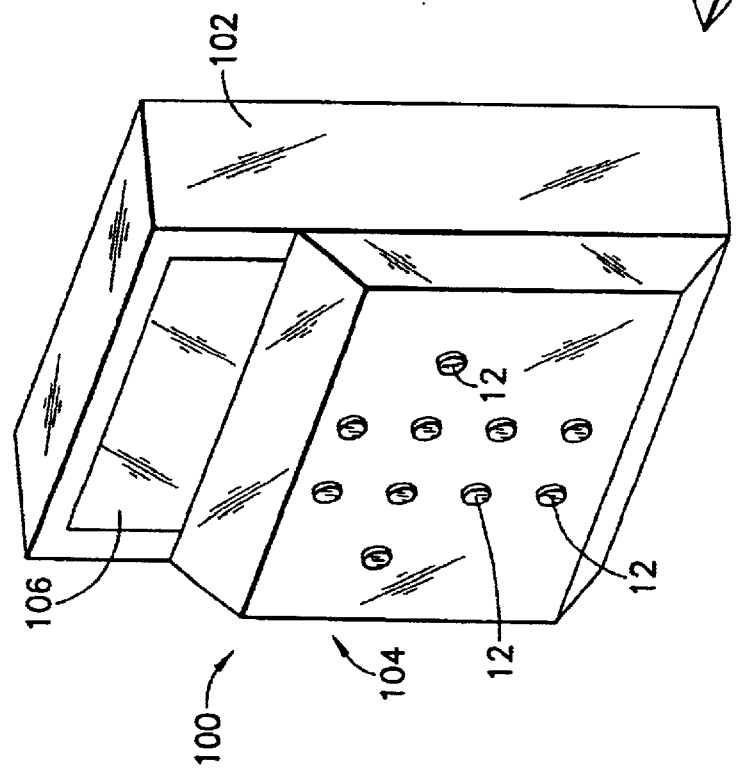
FIG. 1a is a diagrammatic representation illustrating an electronic device having a double-sided keyboard on its cover, showing one set of keys.

FIGS. 1a and 1b illustrate a portable electronic device 100, such as a personal digital assistant, which has a device body 102 and a cover 104. When the cover 104 is in a closed position, it exposes a set of first keys 12, as shown in FIG. 1a. When the cover 104 is in an open position, it exposes a different set of second keys 22, as shown in FIG. 1b. The device body 102 has a display 106 to show information to the user.

Figure 2B:
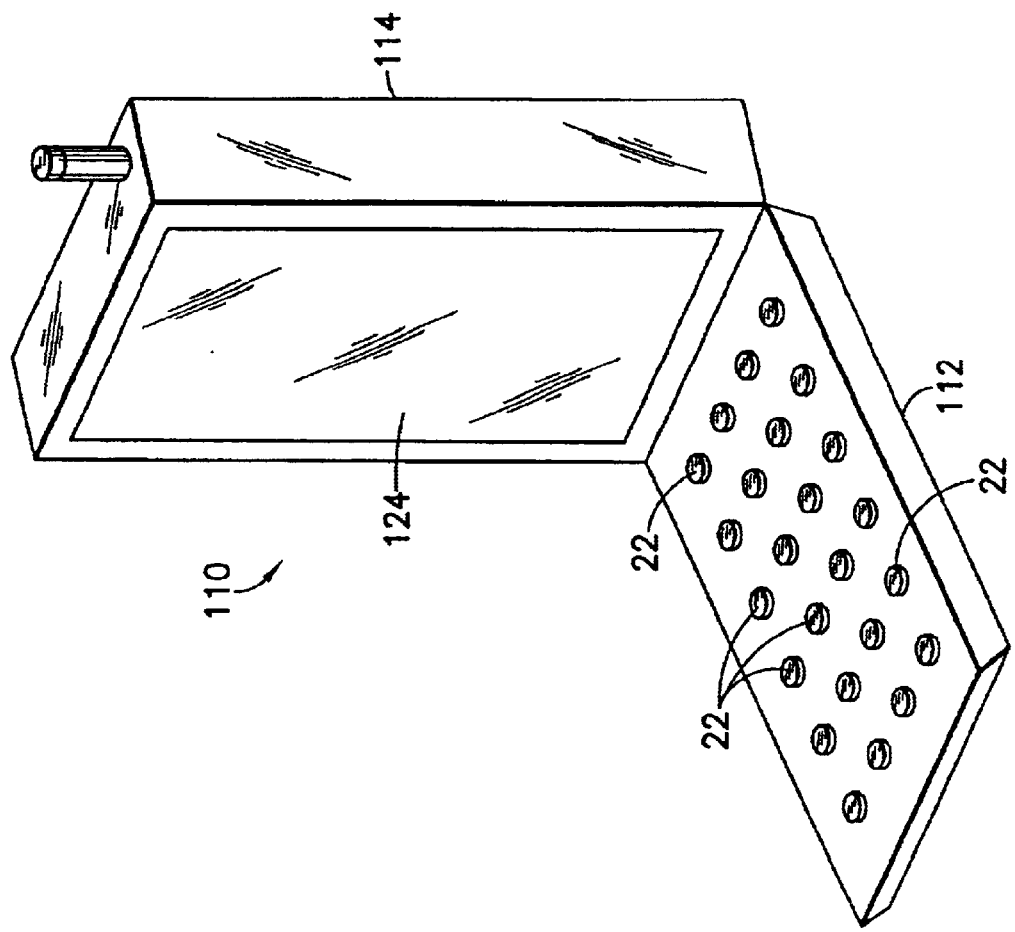
FIG. 2b is a diagrammatic representation illustrating the same communication device with the cover opened to expose another set of keys.
Figure 2A:
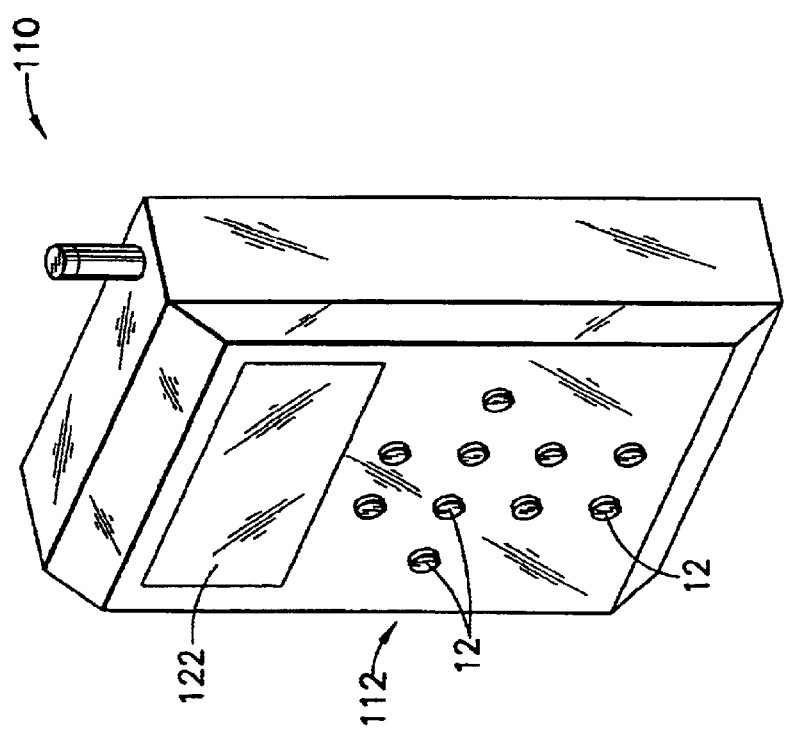
FIG. 2a is a diagrammatic representation illustrating a communication device having a double-sided keyboard on its cover, showing one set of keys.

FIGS. 2a and 2b illustrate a communication device 110, such as a Nokia Communicator, which includes a phone keyboard having a plurality of first keys 12, and a larger keyboard, such as a QWERTY keyboard, having a plurality of second keys 22. The communication device 110 has a display 122 to be used as a phone display when the cover 112 is in a closed position, as shown in FIG. 2a. The communication device 110 also has another display 124 to be used when the cover 112 is an open position, as shown in FIG. 2b.

As shown in FIGS. 1a to 2b, the first keys 12 and the second keys 22 are located on different sides of the cover. Preferably, the key functions of the first keys 12 are different from the key functions of the second keys 22. For example, the first keys 12 include number keys 0 to 9, a star key (*), and a pound sign (#), and the second keys 22 include alphabetic keys. However, it is also possible that some or all of the first keys 12 have the same key functions as those of the corresponding second keys 22. It is possible that the double-sided keyboard is a non-movable part of an electronic device 120 or 122, as shown in FIGS. 3a and 3b. As shown in FIG. 3a, the double-sided keyboard is an extended portion 105 of the device body 102 of the electronic device 120, which includes a display 106. As shown in FIG. 3b, the double-sided keyboard is an extended portion 105 of the device body 103 of the electronic device 122, which has two displays 106 and 107 for allowing a user to see information entered through the keyboard. Furthermore, the electronic device, as shown in FIG. 3a, has a signal/data processor 8, which is operatively connected to a keyboard 1 for receiving information provided by the keyboard 1. Similarly, the electronic device, as shown in FIGS. 1a–2b, 3a and 7a–7c, also has a signal/data processor for receiving information provided by the keyboard 1.

Figure 4C:
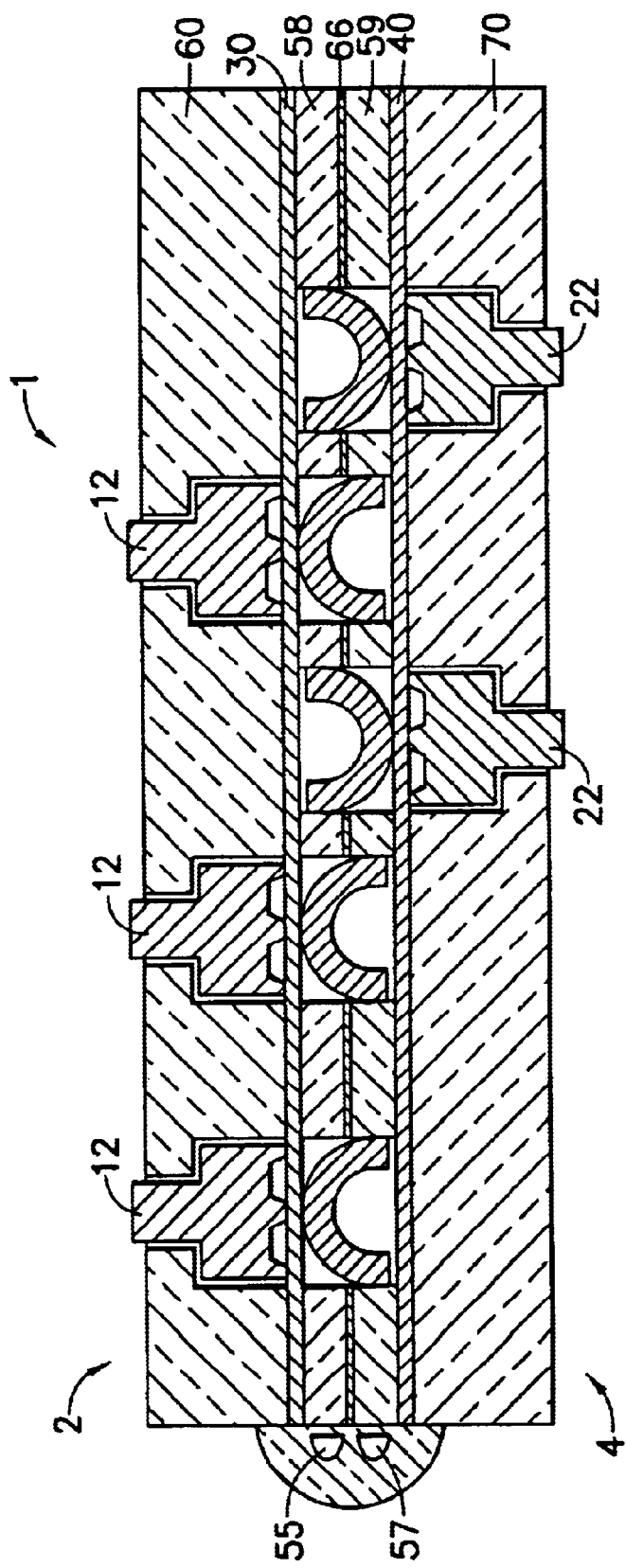
FIG. 4c is a diagrammatic representation illustrating the cross sectional view of the double-sided keyboard, wherein the spacer plate is made of two light guides.

FIGS. 4a–4c are cross sectional views of the double-sided keyboard 1 of the present invention, which can be used on the cover 104 of the electronic device 100, as shown in FIGS. 1a and 1b, the cover 112 of the communication device 110, as shown in FIGS. 2a and 2b, or the extended portion 105 of the electronic devices 120, 122, as shown in FIGS. 3a and 3b. As shown in FIG. 4a, the double-sided keyboard 1 includes an electronic circuit 30 on a first side 2 and another electronic circuit 40 on a second side 4. The electronic circuits 30 and 40 are physically separated by a spacer plate 50. The spacer plate 50 has a plurality of apertures 52 for accommodating a plurality of contacting members 32 and 34. Preferably, the contacting members 32 and 34 are dome-shaped contacts and are electrically conductive. As shown, the dome-shaped contacts 32 are arranged to face the electronic circuit 40, and the dome-shaped contacts 34 are arranged to face the electronic circuit 30. The dome-shaped contacts 32 can be caused to make contact with the electronic circuit 40 when one or more first keys 12 are pressed towards the spacer plate 50. Likewise, the dome-shaped contacts 34 can be caused to make contact with the electronic circuit 30 when one or more second keys 22 are pressed towards the spacer plate 50. Preferably, a supporting mat 60 is used on the first side 2 to retain the first keys 12, and a supporting mat 70 is used on the second side 4 to retain the second keys 22. Preferably, the spacer plate 50 is made from a transparent material, such as clear plastic, so that it can used as a light-guide or a light panel, as shown in FIG. 4b. As shown in FIG. 4b, one or more light sources 56 are used to illuminate the first keys 12 and second keys 22. Preferably, the supporting mats 60 and 70 are made from an opaque material to mask out the areas where the illumination is unnecessary or undesirable.

FIG. 4c shows yet another embodiment of the present invention. As shown, the spacer plate 50 is comprised of two transparent plates 58 and 59 separated by a reflective surface 66. The plates 58 and 59 are light-guides or panels for separately and selectively illuminating the first side 2 and the second side 4 of the keyboard 1. Light sources 55 and 57 can be selectively turned on to provide light to the corresponding light-guides.

Figure 5A:
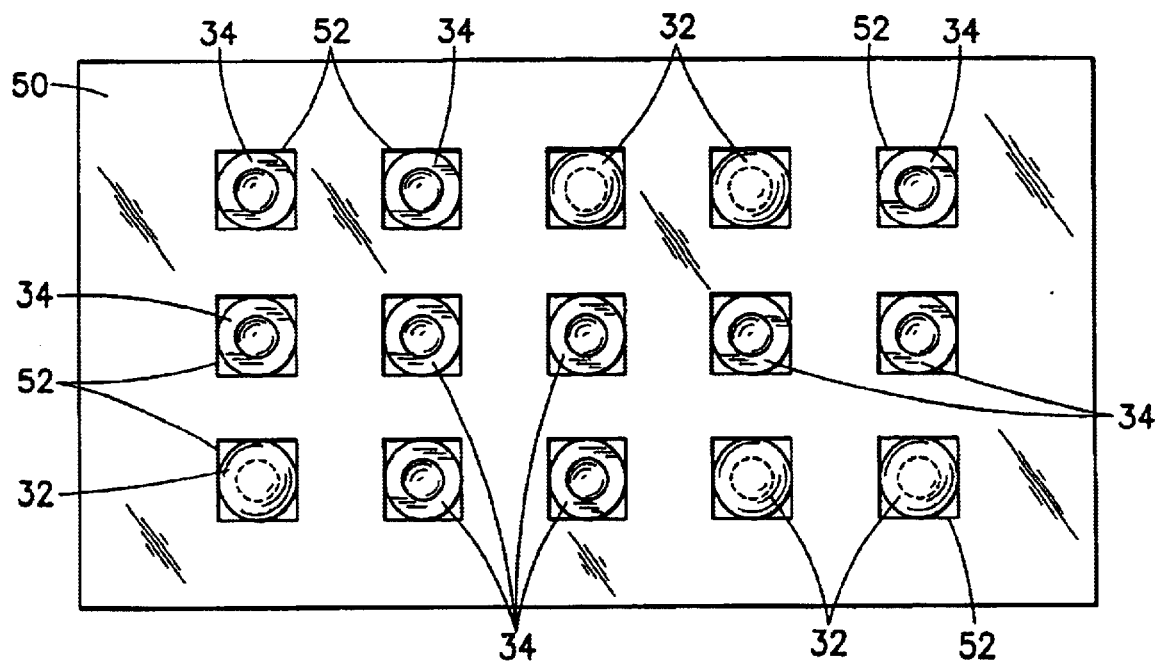
FIG. 5a is a diagrammatic representation illustrating the plane view of the spacer plate.

FIG. 5a is a plane view showing the spacer plate 50 as viewed from the first side 2. FIG. 5a shows an exemplary layout of the apertures 52 on the spacer plate 50 to accommodate the dome-shaped contacts 32 and 34. The dome-shaped contacts 32 are shown to face downward while the dome-shaped contacts 34 are shown to face upward.

Figure 5B:
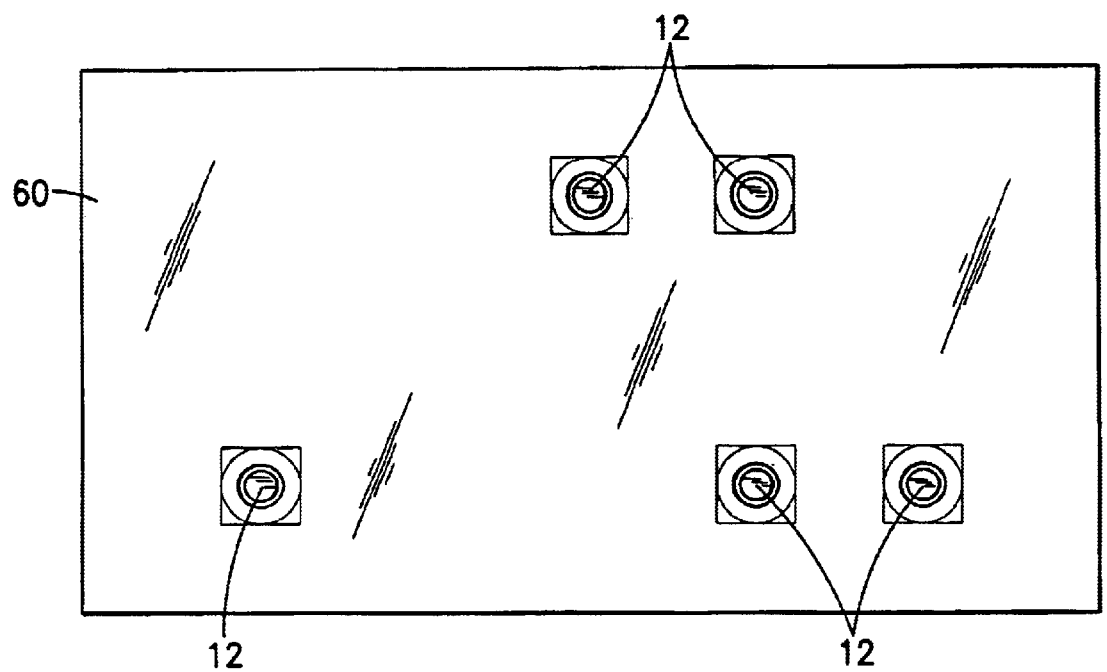
FIG. 5b is a diagrammatic representation illustrating the plane view of one side of the double-sided keyboard.

FIG. 5b is a plane view showing the keyboard 1 as viewed from the first side 2. If the supporting mat 60 is opaque or the reflective surface 66 is used to optically separate the plates 58 and 59, then only the first keys 12 can be seen, as shown in FIG. 5b.

Figure 6A:
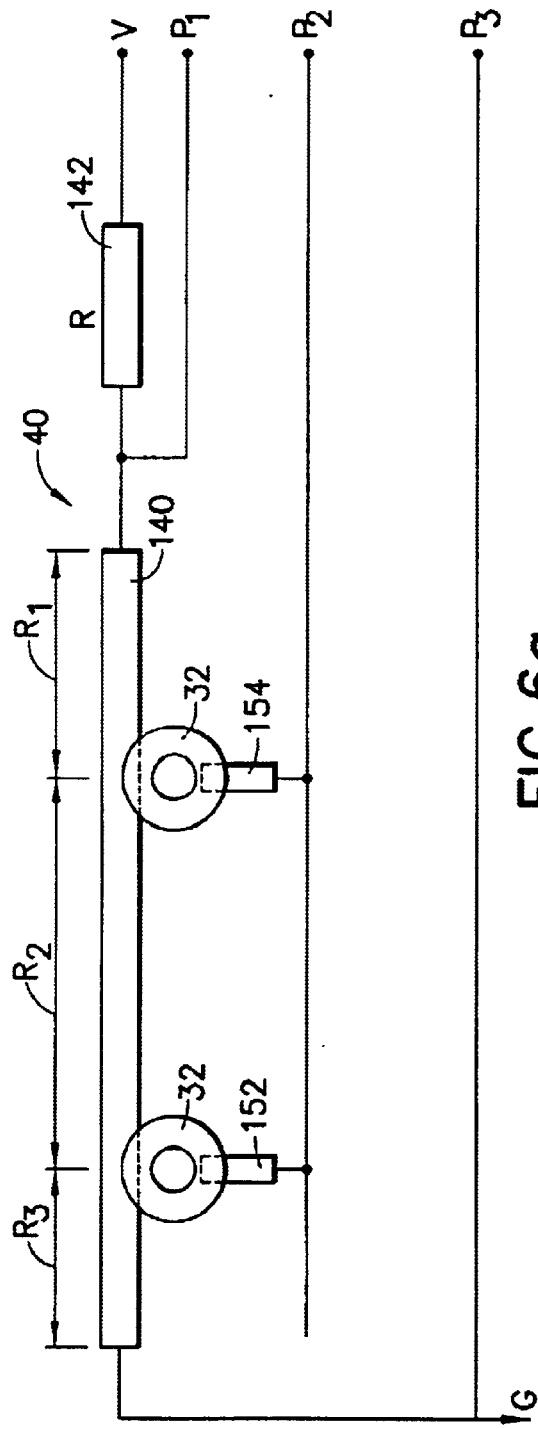
FIG. 6a is a diagrammatic representation illustrating a resistive strip circuit in relation to the contacting members.
Figure 6B:
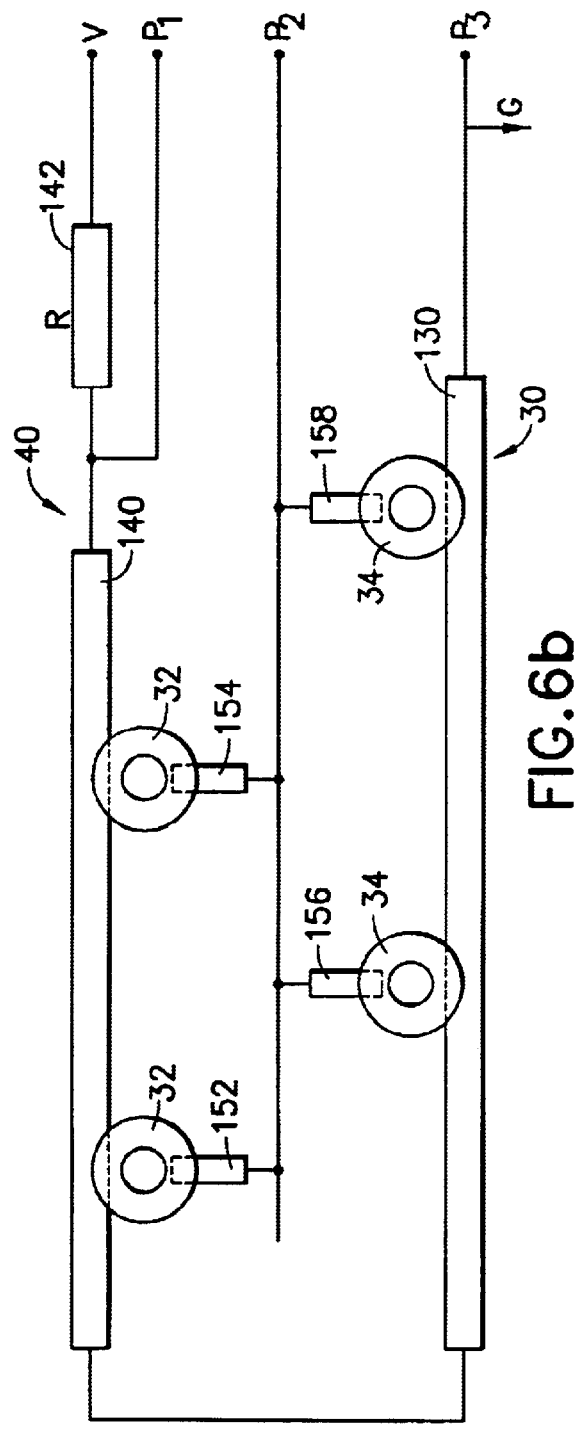
FIG. 6b is a diagrammatic representation illustrating two resistive strips being linked together.

Preferably, the electronic circuits 30 and 40 are implemented in a form of resistive strip circuitry. However, other types of circuitry can also be used. Electronic circuitry for use in a keyboard is known in the art and, therefore, is not a part of the present invention. FIG. 6a shows part of the electronic circuit 40 in which a resistive strip 140 is connected to a voltage source V through a resistor 142 and ground G. A plurality of contact pads 152 and 154 are provided in the proximity of the resistive strip 140 such that the dome-shaped contacts 32 can cause an electrical connection between the resistive strip 140 and one or both of the contact pads 152 and 154 at different contact points. For example, if the contact pad 152 is electrically connected to the resistive strip 140, the electrical contact caused by the dome-shaped contact 32 can be sensed by measuring the ratio of the voltage between points $P_1$ and $P_2$ to the voltage between points $P_2$ and $P_3$. The ratio is substantially equal to $R_1/(R_2+R_3)$ in this case. The electronic circuit 30 is similar to the electronic circuit 40. The electronic circuits 30 and 40 can be used separately to provide information for use in an electronic device. Alternatively, the electronic circuits 30 and 40 can be electrically connected, as shown in FIG. 6b. As shown, a resistive strip 130 is connected in series with the resistive strip 140, and a plurality of contact pads 156 and 158 are provided in the proximity of the resistive strip 130 so that the dome-shaped contacts 34 can cause an electrical connection between one or both of the contact pads 156 and 158 with the resistive strip 140. With the connection shown in FIG. 6b, one or more of the first keys 12 and one or more of the second keys 22 can be pressed separately or simultaneously to provide signals for use in the electronic device.

It is possible to install in the electronic device 100 a contact switch 130, which is operatively connected to the cover 104 and the device body 102, as shown in FIG. 7a. The switch 130 is operable at two different states (open and closed, for example) such that when the cover 104 is closed, as shown in FIGS. 1a, 2a and 7a, only the first keys 12 may be illuminated. When the cover 104 is open, as shown in FIGS. 1b, 2b and 7b, only the second keys 22 may be illuminated. It is well known that a mobile phone that has a phone cover uses an active flip or the like to connect and disconnect a phone call. A similar device can be used for the switch 130.

It is also possible to install on the cover 104 a device 132 similar to a tilt switch or a gravity-sensitive switch, as shown in FIGS. 7b and 7c, which can sense the direction of the cover 104 regarding the gravity. With such a switch, the first side 2 of the keyboard 1 may be illuminated when the first side 2 is facing upward, and the second side 4 may be illuminated when the second side 4 is facing upward. It is also possible to illuminate the first or second sides of the keyboard by user selection.

It should be noted that, as shown in FIGS. 4a–6b, the dome-shaped contacts 32, 34 are electrically conductive so that when the contacts 32, 34 make contact with the electronic circuits 30, 40, they electrically connect different parts in the electronic circuits 30, 40. However, it is not necessary for the contacts 32, 34 to be electrically conductive and for it to physically make contact with the electronic circuits 30, 40 in order to provide information in the keyboard 1. For example, the contacts 32, 34 can be poor electric conductors but they can cause a change in the capacitance between the electronic circuits 30, 40 when they are in close proximity to the electronic circuits 30, 40. This capacitance change can, in turn, cause a frequency change in a signal or other electrical characteristics of the signal in the keyboard 1. The dome-shaped contacts 32, 34 can be made of a variety of materials. For example, they can be made of a non-conductive material and then made conductive by a flexible metal coating; they can be made from an inherently conductive polymer membrane such as polyacetylene; or they can be made of a polymer matrix embedded with a conductive filler, such as carbon or other metallic particles. It is also possible that only the underside of the dome-shaped contacts 32, 34 is made conductive by having a flexible, conductive epoxy adhesive provided thereon, while the rest of the contact is electrically non-conductive.

The electronic circuits 30, 40 may have apertures or cutout sections so that when one section of the circuit is pushed in by the keys 12, 22, the other sections of the circuit do not move as much. It is possible that the electronic circuits 30, 40 have holes 36, 46, as shown in FIG. 8a, to allow the actuating members 14, 24 of the keys 12, 24 to reach the dome-shaped contacts 32, 34 without pushing the electronic circuits 30, 40. As shown in FIG. 8a, the actuating members 14, 24 are extended through the holes 36, 46 of the electronic circuits 30, 40.

It is also possible that the dome-shaped contacts 32 be arranged to face the electronic circuit 30 and the dome-shaped 34 be arranged to face the electronic circuit 40, as shown in FIG. 8b. With this arrangement, the dome-shaped contacts 32 can be caused to make electrical contact with the electronic circuit 30 when one or more first keys 12 are pressed towards the spacer plate 50. Similarly, the dome-shaped contacts 34 can be caused to make electrical contact with the electronic 40 when one or more second keys 22 are pressed towards the spacer plate 50.

Thus, although the invention has been described with respect to a preferred embodiment thereof, it will be understood by those skilled in the art that the foregoing and various other changes, omissions and deviations in the form and detail thereof may be made without departing from the spirit and scope of this invention.

What is claimed is:

1. A keyboard having a first side and a second side for providing information in an electronic device. The keyboard comprises:
    a first electronic circuit located on the first side;
    a second electronic circuit located on the second side;
    a spacer means, located between the first electronic circuit and the second electronic circuit, having a first plurality of apertures adjacent the first electronic circuit and a second plurality of apertures adjacent the second electronic circuit;
    a first plurality of contacting members separately disposed in the first plurality of apertures;
    a second plurality of contacting members separately disposed in the second plurality of apertures;
    a first plurality of keys, located adjacent the spacer means, for causing one or more of the first plurality of contacting members to make electrical contact between at least two electrically different points in the first electronic circuit for providing signals indicative of the information for use in the electronic device, and
    a second plurality of keys, located adjacent the spacer means, for causing one or more of the second plurality of contacting members to make electrical contact between at least two electrically different points in the second electronic circuit for providing signals indicative of the information for use in the electronic device.

2. The keyboard of claim 1, wherein the first plurality of keys are located on the first side and the second plurality of keys are located on the second side.

3. The keyboard of claim 1, wherein the first plurality of keys are located on the second side and the second plurality of keys are located on the first side.

4. The keyboard of claim 1, wherein the spacer means comprises a plate made of a transparent material so that it can also be used as a light guide for illuminating the keyboard.

5. The keyboard of claim 4, further comprising at least one light source which can be turned on to provide light to the transparent plate for illumination.

6. The keyboard of claim 1, wherein the spacer means comprises
    a first plate located adjacent the first electronic circuit for guiding light to illuminate the first side of the keyboard, and
    a second plate located adjacent the second electronic circuit stacked substantially parallel to each other for guiding light to illuminate the second side of the keyboard.

7. The keyboard of claim 6, further comprising at least one light source for selectively providing light to the first plate or the second plate for illumination.

8. The keyboard of claim 6, further comprising at least one first light source for providing light to the first plate for illumination and at least one second light source for providing light to the second plate for illumination.

9. The keyboard of claim 6, further comprising means for providing light to the first plate when the first side of the keyboard faces upward and providing light to the second plate when the second side of the keyboard faces upward.

10. The keyboard of claim 6, further comprising a reflective surface for optically separating the first plate and the second plate.

11. The keyboard of claim 1, further comprising a first support mat located adjacent the first plurality of keys for retaining the first plurality of keys on the keyboard, and a second support mat located adjacent the second plurality of keys for retaining the second plurality of keys on the keyboard.

12. The keyboard of claim 1, wherein the first electronic circuit comprises at least one resistive strip circuit for providing the information for use in the electronic device when one or more of the first plurality of keys are caused to make electrical contact to, the first electronic circuit, and wherein the second electronic circuit comprises at least one resistive strip circuit for providing the information for use in the electronic device when one or more of the second plurality of keys are caused to make electrical contact to the second electronic circuit.

13. The keyboard of claim 12, wherein the first electronic circuit is electronically separated from the second electronic circuit so that the first electronic circuit can provide the information independently of the second electronic circuit.

14. The keyboard of claim 12, wherein the first electronic circuit is electronically connected to the second electronic circuit for jointly providing the information for use in the electronic device.

15. The keyboard of claim 1, wherein the contacting members are dome-shaped.

16. The keyboard of claim 1, wherein the contacting members are electrically conductive.

17. The keyboard of claim 3, wherein each of the first keys has a first actuating member and the second electronic circuit has a plurality of cutout sections substantially aligned with the first actuating members of the first keys for allowing one or more of the first actuating members to move through the cutout sections to cause one or more of the first plurality of contacting members to make contact with the first electronic circuit, and wherein each of the second keys has a second actuating member and the first electronic circuit has a plurality of further cutout sections substantially aligned with the second actuating members of the second keys for allowing one or more of the second actuating members to move through the further cutout sections to cause one or more of the second plurality of contacting members to make contact with the electronic circuit.

18. A method of arranging a keyboard having a first side and a second side for providing information in an electronic device, said method comprising the steps of:
    providing a first electronic circuit located on the first side;
    providing a second electronic circuit located on the second side;
    providing a spacer means between the first electronic circuit and the second electronic circuit, wherein the spacer means includes a first plurality of apertures adjacent the first electronic circuit and a second plurality of apertures adjacent the second electronic circuit;

providing a first plurality of contacting members separately disposed in the first plurality of apertures;

providing a second plurality of contacting members separately disposed in the second plurality of apertures;

providing a first plurality of keys adjacent the spacer means, wherein the first plurality of keys are for causing one or more of the first plurality of contacting members to make electrical contact between at least two electrically different points in the first electronic circuit for providing signals indicative of the information for use in the electronic device, when one or more of the first plurality of keys are pressed towards to the spacer means, and providing a second plurality of keys adjacent the spacer means, wherein the second plurality of keys are for causing one or more of the second plurality of contacting members to make electrical contact between at least two electrically different points in the second electronic circuit for providing signals indicative of the information for use in the electronic device, when one or more of the second plurality of keys are pressed towards the spacer means.

19. The method of claim 18, wherein the first plurality of keys are located on the first side and the second plurality of keys are located on the second side.

20. The method of claim 18, wherein the first plurality of keys are located on the second side and the second plurality of keys are located on the first side.

21. The method of claim 18, wherein the spacer means comprises a plate for guiding light for illuminating the keyboard, said method further comprising the step of providing at least one light source for providing light to the plate for illumination.

22. The method of claim 18, wherein the spacer means comprises
a first plate located adjacent the first electronic circuit for guiding light to illuminate the first side of the keyboard, and
a second plate located adjacent the second electronic circuit stacked substantially parallel to each other for guiding light to illuminate the second side of the keyboard, said method further comprising the step of providing at least one light source for selectively providing light to the first plate or the second plate for illumination.

23. The method of claim 18, wherein the spacer means comprises
a first plate located adjacent the first electronic circuit for guiding light to illuminate the first side of the keyboard, and
a second plate located adjacent the second electronic circuit stacked substantially parallel to each other for guiding light to illuminate the second side of the keyboard, said method further comprising the step of providing at least one first light source for providing light to the first plate for illumination and at least one second light source for providing light to the second plate for illumination.

24. The method of claim 18, wherein the spacer means comprises
a first plate located adjacent the first electronic circuit for guiding light to illuminate the first side of the keyboard, and
a second plate located adjacent the second electronic circuit stacked substantially parallel to each other for guiding light to illuminate the second side of the keyboard, said method further comprising the step of providing means for providing light to the first plate when the first side of the keyboard faces upward and providing light to the second plate when the second side of the keyboard faces upward.

25. The method of claim 18, wherein the spacer means comprises
a first plate located adjacent the first electronic circuit for guiding light to illuminate the first side of the keyboard, and
a second plate located adjacent the second electronic circuit stacked substantially parallel to each other for guiding light to illuminate the second side of the keyboard, said method further comprising the step of providing a reflective surface for optically separating the first plate and the second plate.

26. The method of claim 18, further comprising the step of providing a first support mat located adjacent the first plurality of keys for retaining the first plurality of keys on the keyboard, and a second support mat located adjacent the second plurality of keys for retaining the second plurality of keys on the keyboard.

27. The method of claim 18, wherein the first electronic circuit comprises at least one resistive strip circuit for providing the information for use in the electronic device when one or more of the first plurality of keys are caused to make electrical contact to the first electronic circuit, and wherein the second electronic circuit comprises at least one resistive strip circuit for providing the information for use in the electronic device when one or more of the second plurality of keys are caused to make electrical contact to the second electronic circuit.

28. The method of claim 18, wherein the first electronic circuit is electronically separated from the second electronic circuit so that the first electronic circuit can provide the information independently of the second electronic circuit.

29. The method of claim 18, wherein the first electronic circuit is electronically connected to the second electronic circuit for jointly providing the information for use in the electronic device.

30. The method of claim 18, wherein the contacting members are electrically conductive.

31. The method of claim 18, wherein the electronic device has a first section for housing a signal processor and a second section for implementing the keyboard, said method further comprising the step of movably engaging the first section with the second section for electronically connecting the first section to the second section for the keyboard to convey the information to the signal processor.

32. The method of claim 18, wherein the electronic device has a first section for housing a signal processor and a second section for implementing the keyboard, said method further comprising the step of fixedly engaging the first section with the second section for electronically connecting the first section to the second section for the keyboard to convey the information to the signal processor.

33. An electronic device having a signal processor to process information, said electronic device comprises:
a keyboard having a first side and a second side including:
a first electronic circuit located on the first side;
a second electronic circuit located on the second side;
a spacer means, located between the first electronic circuit and the second electronic circuit, having a first plurality of apertures adjacent the first electronic circuit and a second plurality of apertures adjacent the second electronic circuit;
a first plurality of contacting members separately disposed in the first plurality of apertures;

a second plurality of contacting members separately disposed in the second plurality of apertures;

a first plurality of keys, located adjacent the spacer means, for causing one or more of the first plurality of contacting members to make electrical contact between at least two electrically different points in the first electronic circuit for providing signals indicative of the information for use in the electronic device; and a second plurality of keys, located adjacent to the spacer means, for causing one or more of the second plurality of contacting members to make electrical contact between at least two electrically different points in the second electronic circuit for providing signals indicative of the information for use in the electronic device; and a connection mechanism for conveying the signals to the signal processor.

34. The electronic device of claim 33, further comprising a first section for housing the signal processor and a second section for implementing the keyboard and a movably engaging means for mechanically and electronically connecting the first section to the second section.

35. The electronic device of claim 33, further comprising a first section for housing the signal processor and a second section extended from the first section for implementing the keyboard.

36. The electronic device of claim 33, wherein the first plurality of keys are located on the first side of the keyboard and the second plurality of keys are located on the second side of the keyboard.

37. The electronic device of claim 33, wherein the first plurality of keys are located on the second side of the keyboard and the second plurality of keys are located on the first side of the keyboard.

38. The electronic device of claim 33, wherein the spacer means comprises a plate made of a transparent material so that it can also be used as a light guide for illuminating the keyboard.

39. The electronic device of claim 33, further comprising at least one light source which can be turned on to provide light to the transparent plate for illumination.

40. The electronic device of claim 33, wherein the spacer means comprises a first plate located adjacent the first electronic circuit for guiding light to illuminate the first side of the keyboard, and a second plate located adjacent the second electronic circuit stacked substantially parallel to each other for guiding light to illuminate the second side of the keyboard.

41. The electronic device of claim 40, further comprising at least one light source for selectively providing light to the first plate or the second plate for illumination.

42. The electronic device of claim 40, further comprising at least one first light source for providing light to the first plate for illumination and at least one second light source for providing light to the second plate for illumination.

43. The electronic device of claim 40, further comprising means for providing light to the first plate when the first side of the keyboard faces upward and providing light to the second plate when the second side of the keyboard faces upward.

44. The electronic device of claim 40, further comprising a reflective surface for optically separating the first plate and the second plate.

45. The electronic device of claim 33, wherein the keyboard further comprises a first support mat located adjacent the first plurality of keys for retaining the first plurality of keys on the keyboard, and a second support mat located adjacent the second plurality of keys for retaining the second plurality of keys on the keyboard.

46. The electronic device of claim 33, wherein the first electronic circuit comprises at least one resistive strip circuit for providing the information for use in the electronic device when one or more of the first plurality of keys are caused to make electrical contact to the first electronic circuit, and wherein the second electronic circuit comprises at least one resistive strip circuit for providing the information for use in the electronic device when one or more of the second plurality of keys are caused to make electrical contact to the second electronic circuit.

47. The electronic device of claim 46, wherein the first electronic circuit is electronically separated from the second electronic circuit so that the first electronic circuit can provide the information independently of the second electronic circuit.

48. The electronic device of claim 46, wherein the first electronic circuit is electronically connected to the second electronic circuit for jointly providing the information for use in the electronic device.

* * * * *